United States Patent
García et al.

(10) Patent No.: US 11,473,672 B2
(45) Date of Patent: Oct. 18, 2022

(54) STOWABLE SHIFT LEVER ASSEMBLY

(71) Applicant: Ficosa North America Corporation, Madison Heights, MI (US)

(72) Inventors: Daniel Abad García, Granollers (ES); Carlos López Rodríguez, Barcelona (ES)

(73) Assignee: FICOSA NORTH AMERICA CORPORATION, Madison Heights, MI (US)

( * ) Notice: Subject to any disclaimer, the term of this patent is extended or adjusted under 35 U.S.C. 154(b) by 0 days.

(21) Appl. No.: 17/124,587

(22) Filed: Dec. 17, 2020

(65) Prior Publication Data

US 2021/0102622 A1    Apr. 8, 2021

Related U.S. Application Data

(62) Division of application No. 16/172,160, filed on Oct. 26, 2018, now Pat. No. 10,941,852.

(60) Provisional application No. 62/577,464, filed on Oct. 26, 2017.

(51) Int. Cl.
| | |
|---|---|
| *F16H 59/02* | (2006.01) |
| *F16H 59/10* | (2006.01) |
| *F16H 59/04* | (2006.01) |
| *B60K 20/00* | (2006.01) |
| *F16H 19/00* | (2006.01) |

(52) U.S. Cl.
CPC ............. *F16H 59/02* (2013.01); *F16H 59/10* (2013.01); *F16H 19/001* (2013.01); *F16H 2059/026* (2013.01)

(58) Field of Classification Search
CPC .... F16H 2059/026; F16H 59/10; F16H 59/02; F16H 19/001
See application file for complete search history.

(56) References Cited

U.S. PATENT DOCUMENTS

| | | | |
|---|---|---|---|
| 7,172,063 B2 | 2/2007 | Wendeberg et al. | |
| 7,832,302 B2 | 11/2010 | Wang | |
| 8,485,061 B2 | 7/2013 | Kliemannel et al. | |
| 8,601,896 B2 | 12/2013 | Skogward | |
| 9,303,755 B2 | 4/2016 | Kim | |
| 2004/0159487 A1 | 8/2004 | Wendeberg et al. | |
| 2005/0217405 A1 | 10/2005 | Suzuki | |
| 2006/0060019 A1 | 3/2006 | Sato et al. | |
| 2010/0056331 A1 | 3/2010 | Johansson et al. | |
| 2014/0352476 A1 | 12/2014 | Kim | |

(Continued)

*Primary Examiner* — Jake Cook
(74) *Attorney, Agent, or Firm* — Cantor Colburn LLP (57) ABSTRACT

A shift lever assembly includes a shift lever, a folding device, and a fold interlock device. The shift lever is adapted to move between park and gear positions. The shift lever includes a base structure and an arm pivotally engaged to the base structure about a first axis. The folding device is adapted to pivotally move the arm with respect to the base structure about the first axis and between deployed and stowed states. The fold interlock device is adapted to move between locked and released positions, and includes a locking member adapted to abut the arm in a circumferential direction with respect to the first axis when in the locked position to prevent movement from the deployed state to the stowed state, and to circumferentially clear the arm when in the released position to enable actuation of the folding device from the deployed state to the stowed state.

11 Claims, 6 Drawing Sheets

(56) References Cited

U.S. PATENT DOCUMENTS

| | | |
|---|---|---|
| 2015/0143938 A1 | 5/2015 | Swaita et al. |
| 2018/0244182 A1* | 8/2018 | Keenan .................... B60R 7/04 |
| 2018/0259067 A1 | 9/2018 | Wang et al. |
| 2019/0128402 A1 | 5/2019 | Garcia et al. |

* cited by examiner

STOWABLE SHIFT LEVER ASSEMBLY

CROSS-REFERENCES TO RELATED APPLICATIONS

This application is a divisional of U.S. patent application Ser. No. 16/172,160 filed Oct. 26, 2018, which claims priority to U.S. Provisional Application No. 62/577,464, filed on Oct. 26, 2017, both of which are incorporated herein by reference, in their entireties.

BACKGROUND

The present disclosure relates to a stowable shift lever assembly, and more particularly, to a stowable shift lever assembly that folds.

Shift levers for vehicles are known to provide a vehicle driver with the ability to place a powertrain of the vehicle in various positions that may include a park position, a neutral position, a drive position, a reverse position and/or other gear related positions. The shift levers generally project from a dash or console to provide easy reach for the driver. Unfortunately, and when not in use, the location of the shift lever may be obtrusive for the driver. Moreover, with recent automotive trends concerning autonomous vehicles, use of the shift lever by a driver is less likely.

SUMMARY

A shift lever assembly including a structural support, a shift lever, an autopark device, a folding device, and an interlock device. The shift lever includes a base structure and an arm. The base structure is pivotally engaged to the structural support about a first axis for movement between a park position and a gear position. The arm is pivotally engaged to the base structure about a second axis for movement between a deployed state and a stowed state. The autopark device is carried between the structural support and the base structure to effect movement between the park position and the gear position. The folding device is carried between the arm and the base structure to effect movement between the deployed state and the stowed state. The interlock device is supported by the base structure, adapted to operably interface between the autopark device and the arm, and is configured to move between a locked position and a released position. The locked position prevents movement of the arm with respect to the base structure out of the deployed state, and the released position enables operation of the folding device from the deployed state to the stowed state.

A shift lever according to one, non-limiting, exemplary embodiment includes a shift lever, a folding device, and a fold interlock device. The shift lever is adapted to move between a park position and a gear position, and includes a base structure and an arm pivotally engaged to the base structure about a first axis. The folding device is adapted to pivotally move the arm with respect to the base structure about the first axis and between a deployed state and a stowed state. The fold interlock device is adapted to move between a locked position and a released position. The fold interlock device includes a locking member adapted to abut the arm in a circumferential direction with respect to the first axis when in the locked position to prevent movement from the deployed state to the stowed state, and circumferentially clear the arm when in the released position to enable actuation of the folding device from the deployed state to the stowed state.

A method for stowing a shift lever according to another, non-limiting, embodiment includes actuating an autopark device to move a shift lever about a first axis from a gear position to a park position. An interlock device is then driven via actuation of the autopark device from a locked position, wherein a component of the interlock device abuts a stop of an arm of the shift lever, and to a released position, wherein the component is cleared from the stop. The arm is then folded with respect to a base structure of the shift lever and about a second axis, when the interlock device is in the released position.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
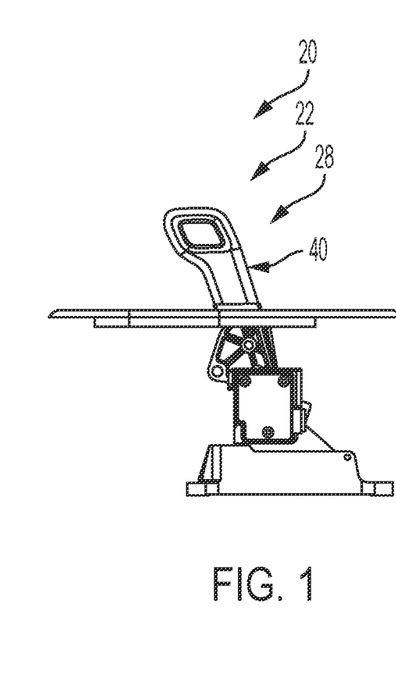
FIG. 1 is a side view of a shift lever assembly in a deployed state and a park position, and in accordance with an exemplary embodiment of the present disclosure.
Figure 2:
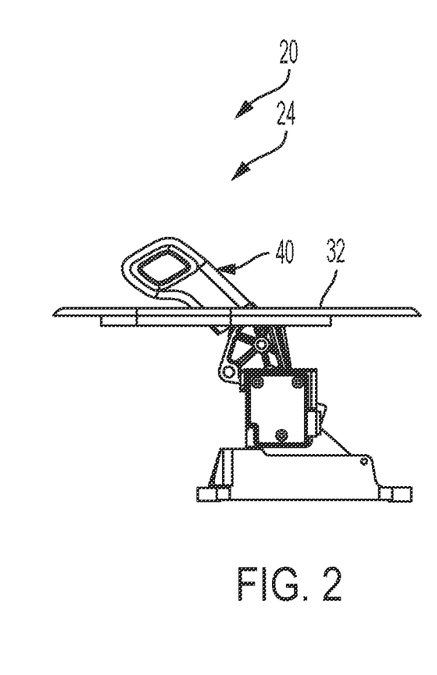
FIG. 2 is a side view of the shift lever assembly in a folding state.
Figure 3:
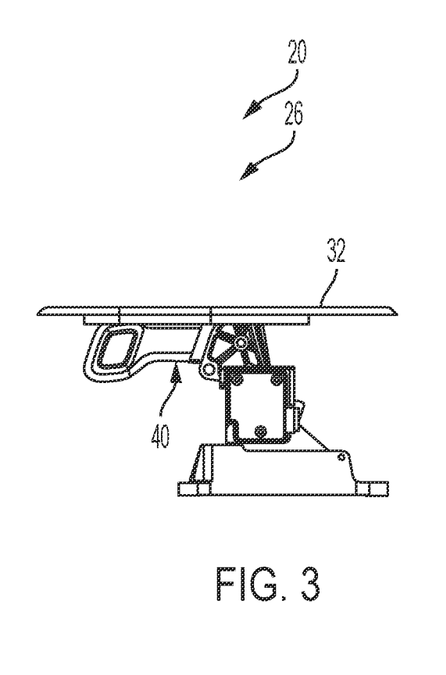
FIG. 3 is a side view of the shift lever assembly in a stowed state.
Figure 6:
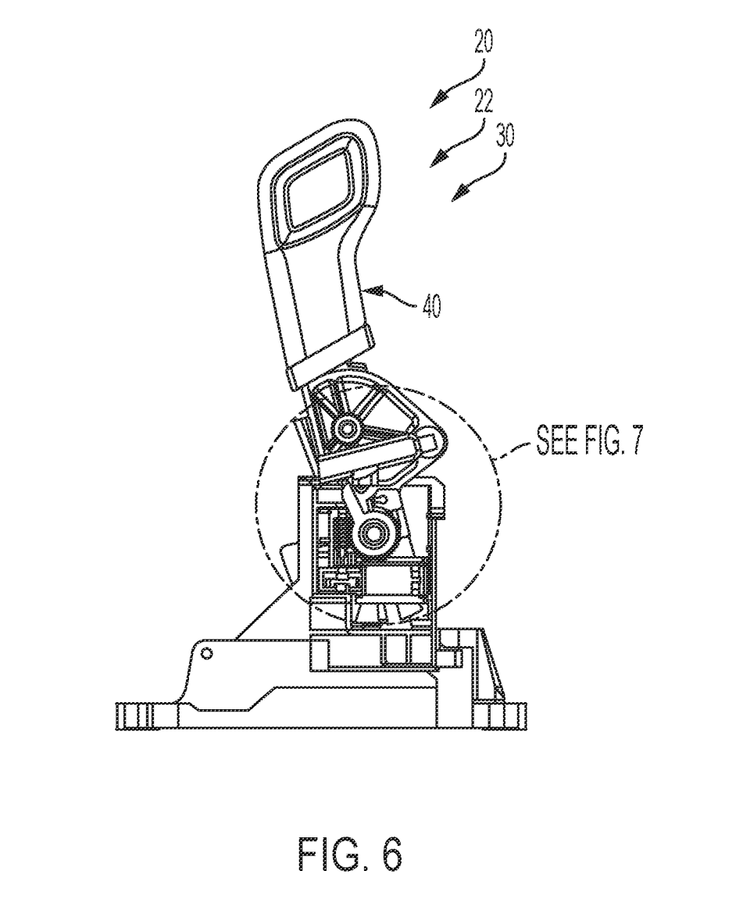
FIG. 6 is an opposite side view of the shift lever assembly in the deployed state and in a gear position (i.e., other than the park position), and illustrating a fold interlock device and an autopark system working.
Figure 10:
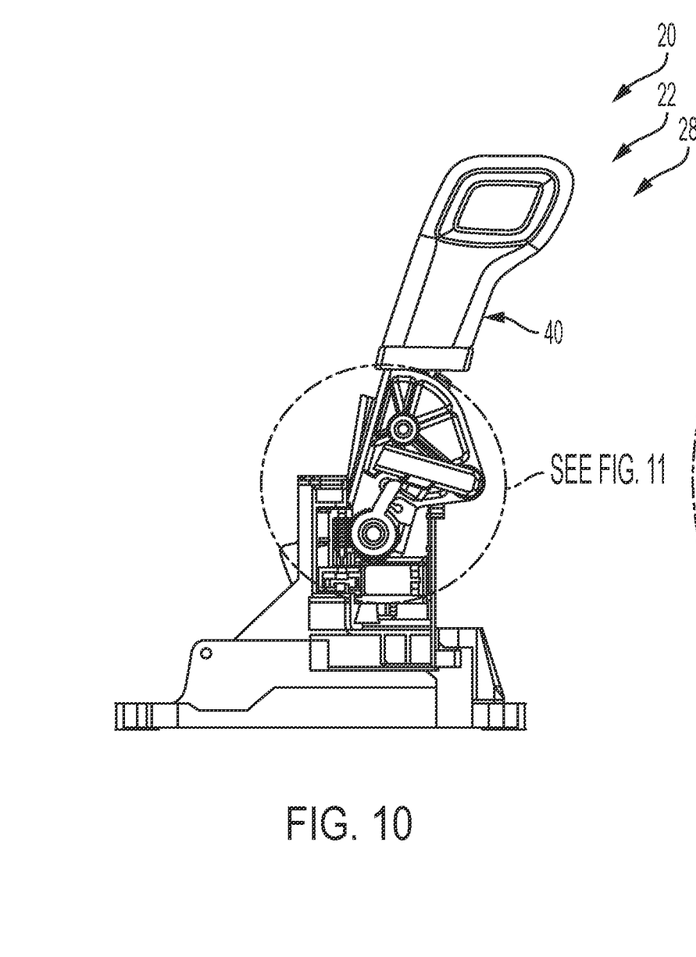
FIG. 10 is an opposite side view of the shift lever assembly in the deployed state and in the park position, and illustrating the fold interlock device and the autopark device moving toward respective released and park positions.

Referring now to the Figures, where the present disclosure will be described with reference to specific embodiments, without limiting same, a shift lever assembly 20 of a vehicle is adapted to move from a deployed state 22 (see FIG. 1), through a dynamic folding state 24 (see FIG. 2), and to a folded or stowed state 26 (see FIG. 3). When in the deployed state 22, the shift lever assembly 20 may be in a park position 28 (see FIGS. 1, 4, and 10) or a gear position 30 (see FIG. 6). Examples of a gear position 30 may include a drive position, a neutral position, a reverse position, and others. In one embodiment, the shift lever assembly 20 must first be in the park position 28 prior to the shift level assembly 20 initiating and/or advancing through the folding state 24. When the shift lever assembly 20 is in the stowed state 26, the shift lever assembly 20 may be fully folded and concealed beneath a console 32 of the vehicle. Although not illustrated, the console 32 may include a cover or door that conceals the shift lever assembly 20 when in the stowed state 26, and automatically opens to deploy the shift lever assembly 20. In one embodiment, the shift lever assembly 20 is adapted not to begin, or blocked from beginning, the folding operation until the shift lever assembly 20 is in the park position 28.

Figure 7:
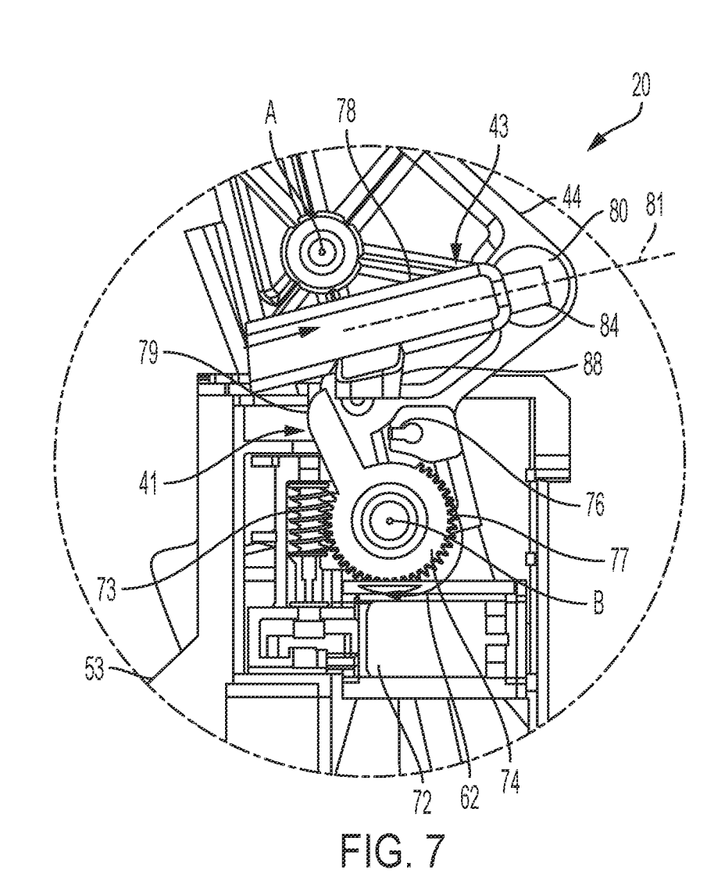
FIG. 7 is a partial enlarged side view of the shift lever assembly taken from circle 7 of FIG. 6.
Figure 8:
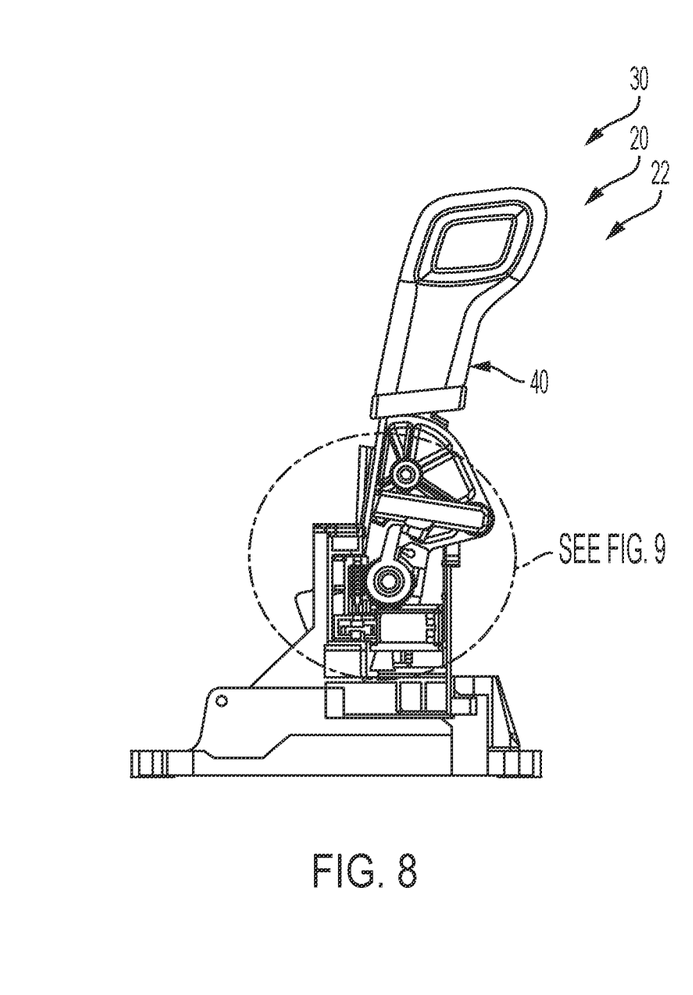
FIG. 8 is an opposite side view of the shift lever assembly in the deployed state and moving from the gear position toward the park position, and illustrating the fold interlock device and an autopark system moving the interlock device.
Figure 12:
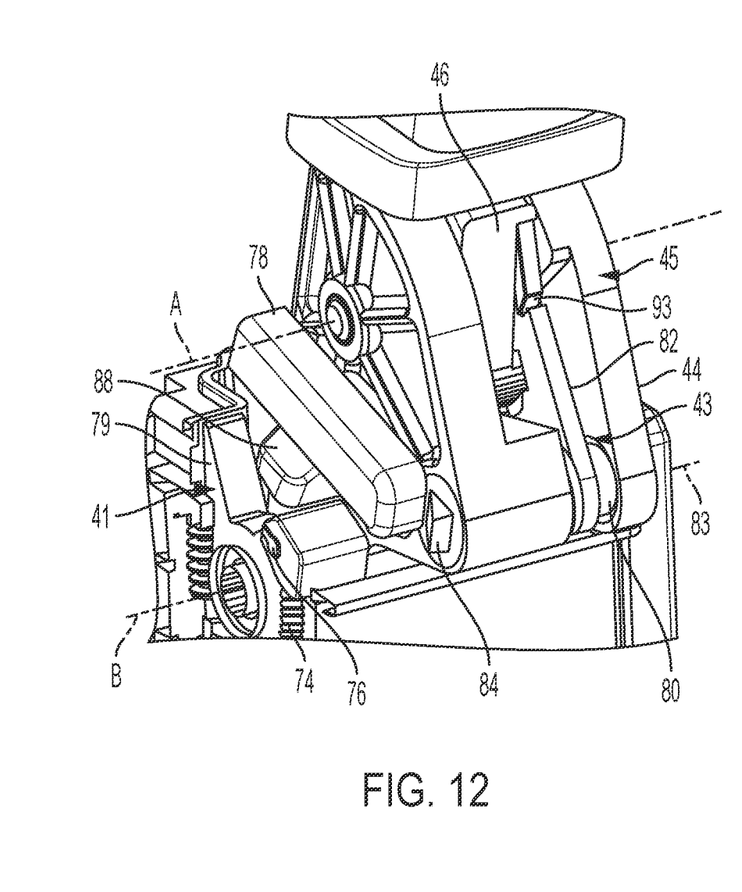
FIG. 12 is a partial perspective view of the shift lever assembly illustrating the fold interlock device in a locked position.
Figure 13:
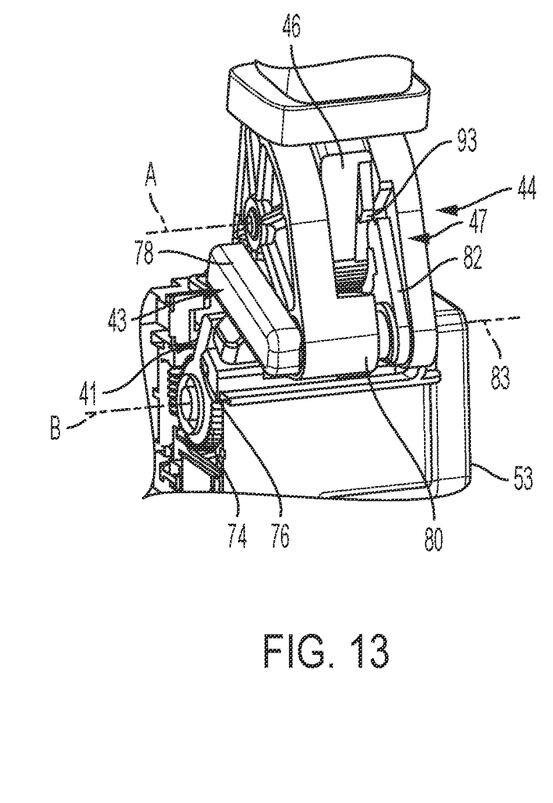
FIG. 13 is a partial perspective view of the shift lever assembly illustrating the fold interlock device in a released position.

The shift lever assembly 20 may include the console 32 (see FIGS. 1-3), a shift lever 40, an autopark device 41 (see FIGS. 7 and 9), a folding device 42 (see FIGS. 4 and 5), and an interlock device 43 (see FIGS. 7, 12, and 13). In one embodiment, and during operation, the autopark device 41 is adapted to automatically place the shift lever assembly 20 in the park position 28 from any gear position 30 upon, for example, when a driver leaves the vehicle, the ignition key is switch off, or other scenarios signifying a cease in operation of the vehicle.

The interlock device 43 is constructed to prevent folding of the shift lever 40 (i.e., locks the shift lever 40 in the deployed state 22) when the shift lever 40 is not in the park position 28. Actuation of the autopark device 41 may, in-turn, effect actuation of the interlock device 43 repositioning the interlock device 43 from a locked position 45 (see FIG. 12) to a released position 47 (see FIG. 13). With the interlock device 43 in the released position 47 (i.e., thus the shift lever 40 is in the park position 28), the folding device 42 is free to move the shift lever 40 from the deployed state 22 to the stowed state 26.

Figure 4:
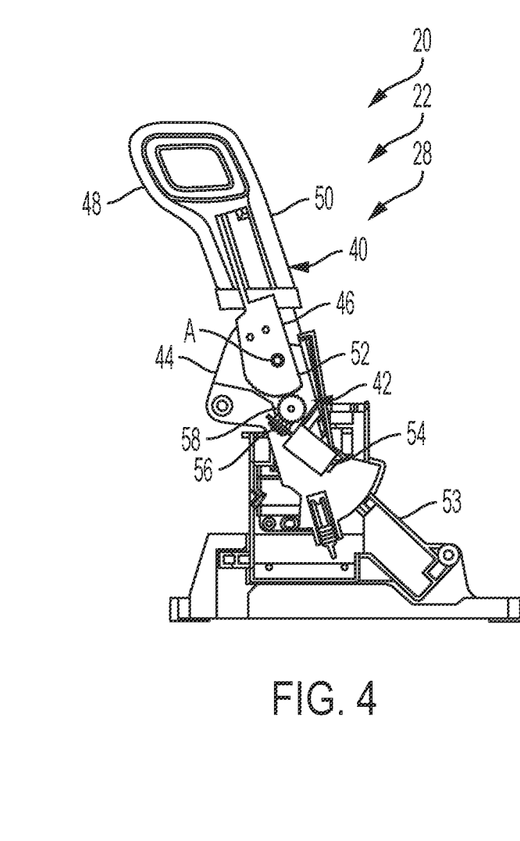
FIG. 4 is a side view of the shift lever assembly similar in perspective to FIG. 1, but with portions removed to illustrate a folding device of the shift lever assembly.

Referring to FIG. 4, the shift lever 40 may generally be elongated, and may include a base structure 44, an arm 46 and a knob 48. The base structure 44 may be located beneath the console 32 regardless of whether the shift lever assembly 20 is in the deployed state 22 or the stowed state 26. The arm 46 may include opposite end portions 50, 52, and may be pivotally engaged to a portion of the base structure 44 about an axis "A", and generally at the end portion 52. The arm 46 is in a folding relationship (i.e., foldably coupled to) the base structure 44 via the pivotal engagement at the axis A. The knob 48 is engaged to the end portion 50 of the arm 46 that may be a distal end portion. It is contemplated and understood that the arm 46 may be an additional element that does not act as a knob support.

Referring to FIG. 7, the base structure 44 of the shift lever 40 may be pivotally engaged to a structural support 53 of the shift lever assembly 20 about an axis "B". In one embodiment, the structural support 53 is stationary and fixed to the vehicle. The arm 46 of the shift lever 40 is pivotally engaged to the base structure 44 at axis "A" for folding movement between the deployed and stowed states 22, 26. The base structure 44 of the shift lever 40 is pivotally engaged to the structural support 53 at axis "B" for movement between the park and gear positions 28, 30. In one embodiment, axis "A" is spaced from, and substantially parallel too, axis "B".

The autopark device 41 of the shift lever assembly 20 is carried between the structural support 53 and the base structure 44 of the shift lever 40 to effect movement between the park position 28 and the gear position 30. The folding device 42 is carried between the arm 46 and the base structure 44 of the shift lever 40 to effect movement between the deployed state 22 and the stowed state 26 when the shift lever assembly 20 is in the park position 28. The interlock device 43 is supported by the base structure 44, is adapted to operable interface between the autopark device 41 and the arm 46 of the shift lever 40, and is configured to move between the locked position 45 and the released position 47. When in the locked position 45, inadvertent folding of the shift lever 40 (e.g., back-driving of the folding device 42 is prevented. When the interlock device 43 is in the released position 47, shift lever assembly 20 is in the park position 28 and operation of the folding device 42 is enabled.

Figure 5:
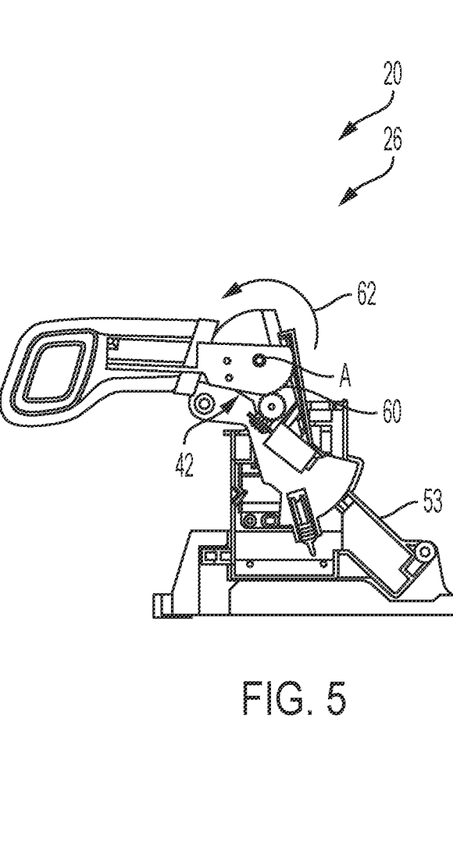
FIG. 5 is a side view of the shift lever assembly similar in perspective to FIG. 3, but with portion removed to illustrate the folding device.

Referring to FIGS. 4 and 5, and in one embodiment, the folding device 42 is configured for automatic operation. To facilitate automatic operation, the folding device 42 may include a servo or electric motor 54 fixed to the base structure 44 of the shift lever 40 and a gear train operably engaged between the motor 54 and the end portion 52 of the arm 46. The gear train may include a worm gear 56, a disc gear 58, and a plurality of teeth 60 carried by a distal cam surface of the end portion 52 of the arm 46. A rotating shaft of the motor 54 is fixed and co-extends with the worm gear 56. The worm gear 56 is adapted to mesh with and drive the disc gear 58 that is rotatably connected to, and supported by, the base structure 44 of the shift lever 40. The disc gear 58 operably meshes with the teeth 60 of the arm 46.

In operation, the motor 54 of the folding device 42 may drive the worm gear 56 that, in-turn, rotates the disc gear 58 about an axis that may be spaced from, and parallel to, axis "A". As the disc gear 58 rotates, the disc gear 58 meshes with the teeth 60 of the arm 46, and pivots the arm 46 about axis "A" (see direction arrow 62) moving the shift lever 40 from the deployed state 22 (see FIG. 4), through the folding state 24, and to the stowed state 26 (see FIG. 5). In another embodiment, the folding device 42 may not include the motor 54 and other automating features, and instead may be manually actuated.

Figure 9:
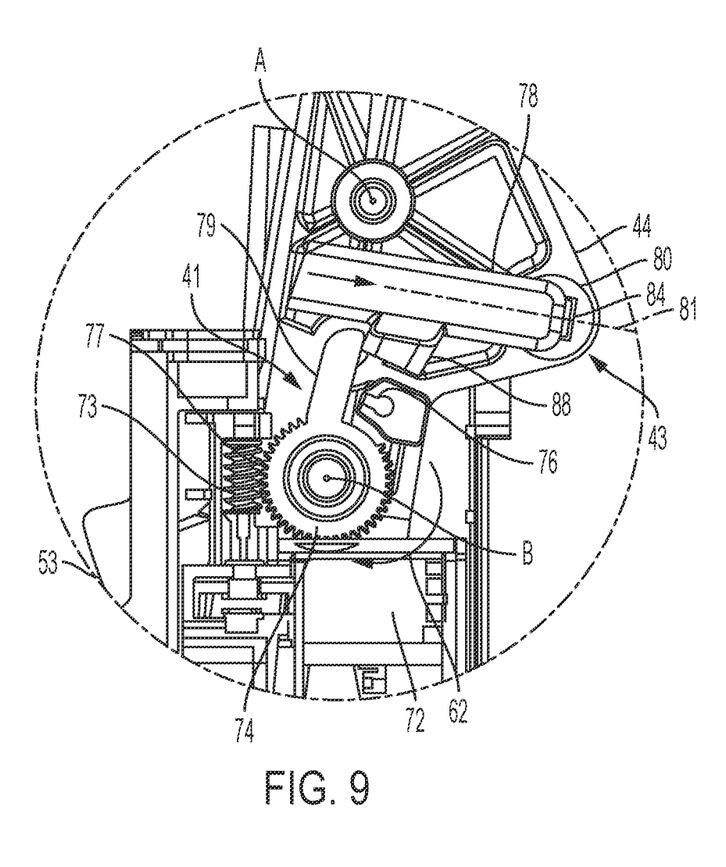
FIG. 9 is a partial enlarged side view of the shift lever assembly taken from circle 9 of FIG. 8.
Figure 11:
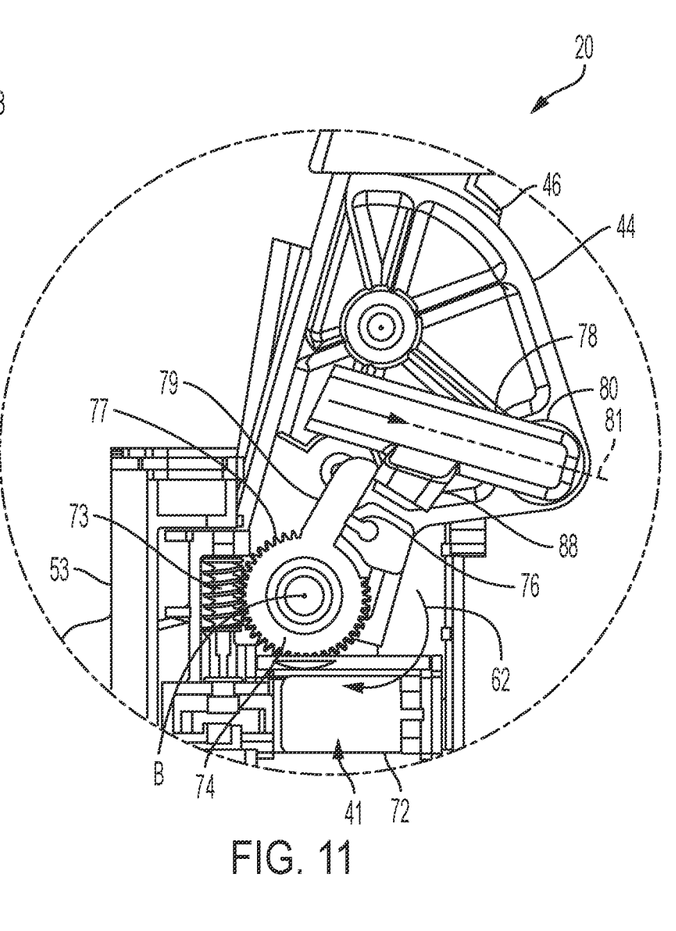
FIG. 11 is a partial enlarged side view of the shift lever assembly taken from circle 11 of FIG. 10.

Referring to FIGS. 7, 9, and 11, the autopark device 41 may include a servo, or electric motor 72 and a gear train. The gear train may include a worm gear 73 driven by the motor 72, a geared cam 74 adapted to rotate about axis "B" and driven by the worm gear 73, and an integer 76 fixed to the base structure 44 of the shift lever 40. In one embodiment, the integer 76 may project axially outward from the base structure 44 with respect to axis "B" for contact with the geared cam 74 in the circumferential direction 62. This contact indexes the shift lever assembly 20 in the park position 28.

The geared cam 74 may include a disc or annular portion 77 disposed concentric to axis "B", a plurality of teeth carried by an outer surface or rim of the disc portion 77 and distributed circumferentially, and a protrusion 79 that may project radially outward from the disc portion 77. In one example, the protrusion 79 is adapted to contact the integer 76 when in the park position 28.

In one embodiment, the fold interlock device 43 may be generally driven by the autopark device 41. As such, the fold interlock device 43 may include a sliding component 78 carried and supported by the base structure 44 and constructed to slide along a centerline 81 that may be linear (see FIGS. 7, 9, and 11), and an axial component 80 constructed to slide along a centerline 83 that may be linear (see FIGS. 12 and 13). The axial component 80 may include a locking member 82 and a cam surface 84 (i.e., ramp, see FIG. 12) at opposite axial ends with respect to centerline 83. The cam surface 84 is adapted to contact the sliding component 78 as the shift lever assembly 20 approaches the park position 28 via the autopark device 41. As the sliding component 78 rides upon the cam surface 84, the axial component 80 shifts, or is displaced, axially with respect to centerline 83. This displacement causes the locking member 82 to clear the arm 46 of the shift lever 40 placing the interlock device 43 in the released position 47 and enabling the folding device 42 to move toward the stowed state 26. In one embodiment, the axis "A", the axis "B", and the centerline 83 are spaced from, and substantially parallel to, one-another. The centerline 81 is substantially normal to, and may generally intersect, the centerline 83.

In one embodiment, the geared cam 74 is rigidly fixed to the base structure. During operation of the autopark device 41, there is generally a lost motion, or displacement between the base structure 44 of the shift lever 40 and the sliding component 78. That is, the axial component 80 moves with the rotation (see arrow 62) of the base structure 44 (see FIG. 7), while the sliding component 78 moves linearly toward the axial component 80 to place the interlock device 43 in the released position 47 (see FIG. 13). It is contemplated and understood that a force may be exerted against the sliding component 78 that biases the sliding component away from the axial component 80 (i.e., a spring not shown). Similarly, or alternatively, a force may be exerted against the axial component 80 that biases the axial component toward the locked position 45 and away from the released position 47.

The locking member 82 is attached, or fixed, to an opposite end portion of the sliding component 78 and projects radially outward with respect to centerline 83 for releasable engagement (i.e., locking to) the arm 46 of the shift lever 40 when in the locked position 45. More specifically, a distal end portion of the locking member 82 is in circumferential contact with a stop 93 that faces in a substantially circumferential direction with respect to axis "A".

Although not illustrated, it is contemplated and understood that the fold interlock device 43 may be, or may be part of, the autopark device 41. It is further contemplated that the sliding and axial components 78, 80 of the interlock device 43 may both include biasing means (e.g., springs) for returning the components from the released position 47 (see FIG. 13) to the locked position 45 (see FIG. 12). For example, the axial component 80 may interact with a coiled spring that exerts a force in an axial direction with respect to centerline 83 that opposes axial movement (see arrow 90 in FIG. 13) toward the released position 47.

In operation of the shift lever assembly 20 and when initially in the deployed state 22, the gear position 30, and the locked position 45, the motor 72 of the autopark device 41 may drive the shift lever 40 to the park position 28 via the geared cam 74 constructed to contact the integer 76 when the park position 28 is established. At the same time, the protrusion 79 of the geared cam 74 of the autopark device 41 may contact a protrusion 88 laterally projecting outward from the sliding component 78 of the fold interlock device 43. Upon continued contact, the geared cam 74 moves the sliding component 78 to the cam surface 84 of the axial component 80. As the sliding component 78 continues to move, the axial component 80 moves axially along the centerline 83. The locking member 82 of the axial component 80 is thus displaced axially and releases the locking member 82 with respect to the arm 46 of the shift lever 40. Once released (i.e., the released position 47), the folding device 42 may operate to fold the shift lever 40 in order to place the shift lever assembly 20 in the stowed state 26.

During the folding and stowed states 24, 26, even if the sliding component 78 is not in contact with the cam surface 84 of the axial component 80, the interlock device 43 cannot return to the locked position 45 from the released position 47 because the stop 93 of the shift lever arm 46 obstructs the movement (i.e., a contact surface 92 carried by the arm 46 axially abuts the locking member 82 when the arm 46 is not in the deployed state 22). Only when the shift lever 40 is in the deployed state 22, can the locking member 82 return to its locked position 45, thus engaging with the stop 93.

In another embodiment, the integer 76 may not exist, and the geared cam 74 of the autopark device 41 may move the sliding component to the cam surface 84. Once the cam surface 84 moves the axial component 80, the sliding component 78 of the fold interlock device 43 may arrive at a stopper (i.e., positive stop at the end of the ramp). The movement of the sliding component 78 via the geared cam 74 may also cause the movement of the shift lever 40.

It is contemplated and understood that the fold interlock device 43 may provide structural rigidity between the base structure 44 and the arm 46 of the shift lever 40 when in the deployed state 22. This rigidity may be desirable for normal (i.e., manual) operation of the shift lever assembly 20 by the driver. It is further contemplated that the motors 54, 72 of the respective folding device 42 and fold interlock device 43 may be energized or actuated upon the occurrence of prespecified events, states, positions, and/or orientations. Such control of the motors 54, 72 may be controlled via a controller and/or microprocessor (not shown).

In another embodiment, folding of the shift lever 40 may not initiate until an autopark device 41 is working/operating. If the autopark device 41 is not working, even if in the park position 28, the shift lever 40 may not be stowed (i.e., safety feature). Depending on the autopark design, the shift lever 40 may be folded when in the park position 28, or in other gear position(s).

Advantages and benefits of the present disclosure include a folding shift lever assembly that provides space for an occupant while being less invasive with surrounding components. Other advantages include the ability to assure the shift lever assembly is in a park position before folding the shift lever.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A shift lever assembly comprising:
   a shift lever adapted to move between a park position and a gear position, the shift lever including a base structure and an arm pivotally engaged to the base structure about a first axis;
   a folding device adapted to pivotally move the arm with respect to the base structure about the first axis and between a deployed state and a stowed state;
   a fold interlock device adapted to move between a locked position and a released position, the fold interlock device including a locking member adapted to abut the arm in a circumferential direction with respect to the first axis when in the locked position to prevent movement from the deployed state to the stowed state, and to circumferentially clear the arm when in the released position to enable actuation of the folding device from the deployed state to the stowed state; and an autopark device configured to move the shift lever from the gear position to the park position when the shift lever is in the deployed state, the autopark device including a cam engaged to the base structure and adapted to rotate about a second axis disposed parallel to and spaced from the first axis, wherein rotation of the cam about the second axis moves the shift lever from the gear position to the park position.

2. The shift lever assembly set forth in claim 1, wherein the autopark device includes an electric motor adapted to rotationally drive the cam.

3. The shift lever assembly set forth in claim 1, wherein the shift lever is adapted to pivot about the second axis when moving between the park position and the gear position.

4. The shift lever assembly set forth in claim 2, wherein the fold interlock device includes a motor attached to the base structure and adapted to drive the arm about the first axis.

5. A shift lever assembly comprising:

a shift lever adapted to move between a park position and a gear position, the shift lever including a base structure and an arm pivotally engaged to the base structure about a first axis;

a folding device adapted to pivotally move the arm with respect to the base structure about the first axis and between a deployed state and a stowed state;

a fold interlock device adapted to move between a locked position and a released position, the fold interlock device including a locking member adapted to abut the arm in a circumferential direction with respect to the first axis when in the locked position to prevent movement from the deployed state to the stowed state, and to circumferentially clear the arm when in the released position to enable actuation of the folding device from the deployed state to the stowed state; and a structural support, wherein the base structure is pivotally engaged to the structural support about a second axis for movement between the park position and the gear position.

6. The shift lever assembly set forth in claim 5, further comprising:

an autopark device carried between the structural support and the base structure to effect movement between the park position and the gear position.

7. The shift lever assembly set forth in claim 6, wherein the folding device is carried between the arm and the base structure to effect movement between the deployed state and the stowed state.

8. The shift lever assembly set forth in claim 7, wherein the fold interlock device is supported by the base structure.

9. The shift lever assembly set forth in claim 8, wherein the fold interlock device is adapted to operably interface between the autopark device and the arm.

10. The shift lever assembly set forth in claim 9, wherein the locked position prevents movement of the arm with respect to the base structure out of the deployed state.

11. The shift lever assembly set forth in claim 10, wherein the released position enables operation of the folding device from the deployed state to the stowed state.

\* \* \* \* \*